Patented Aug. 14, 1951

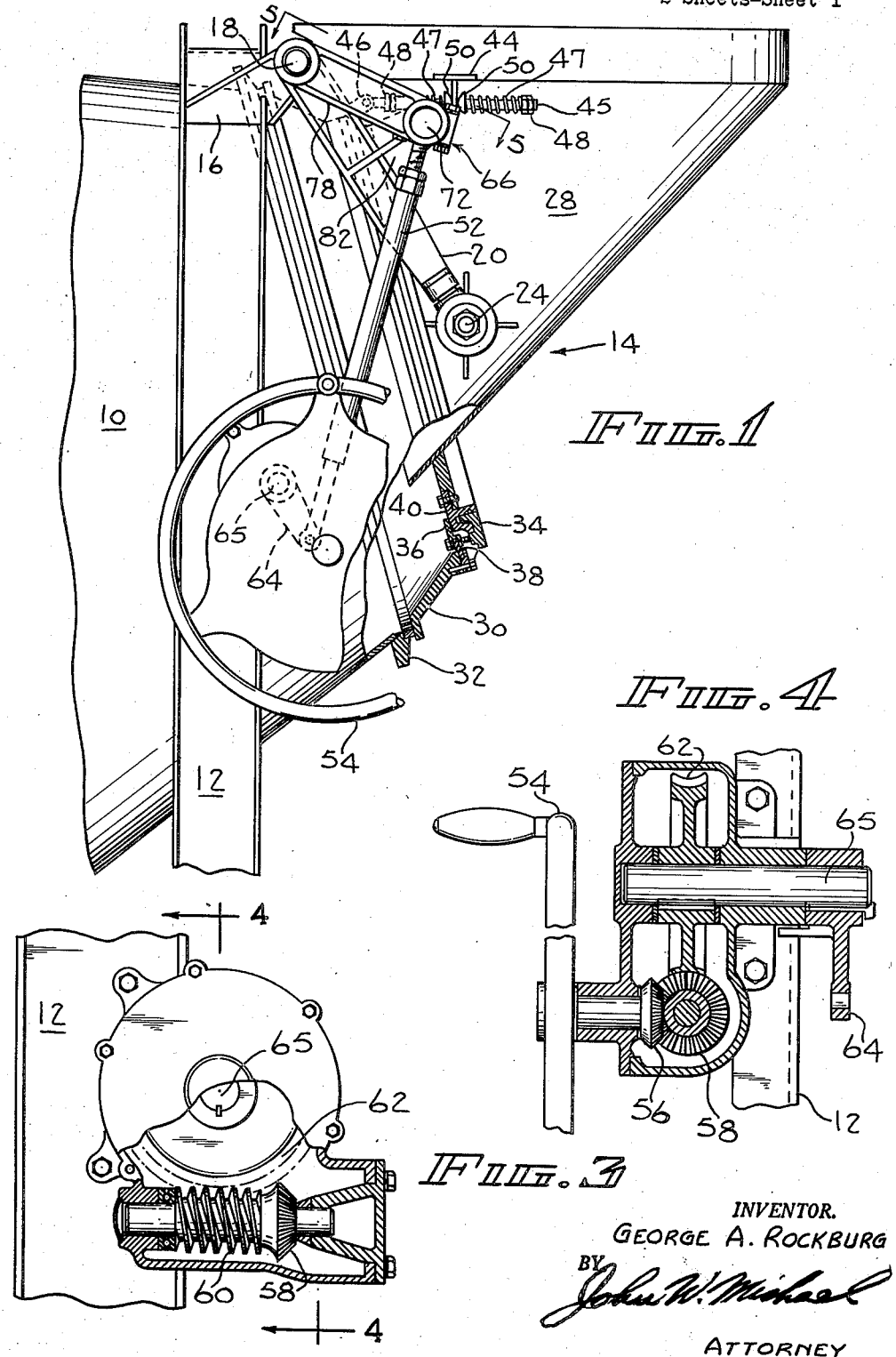

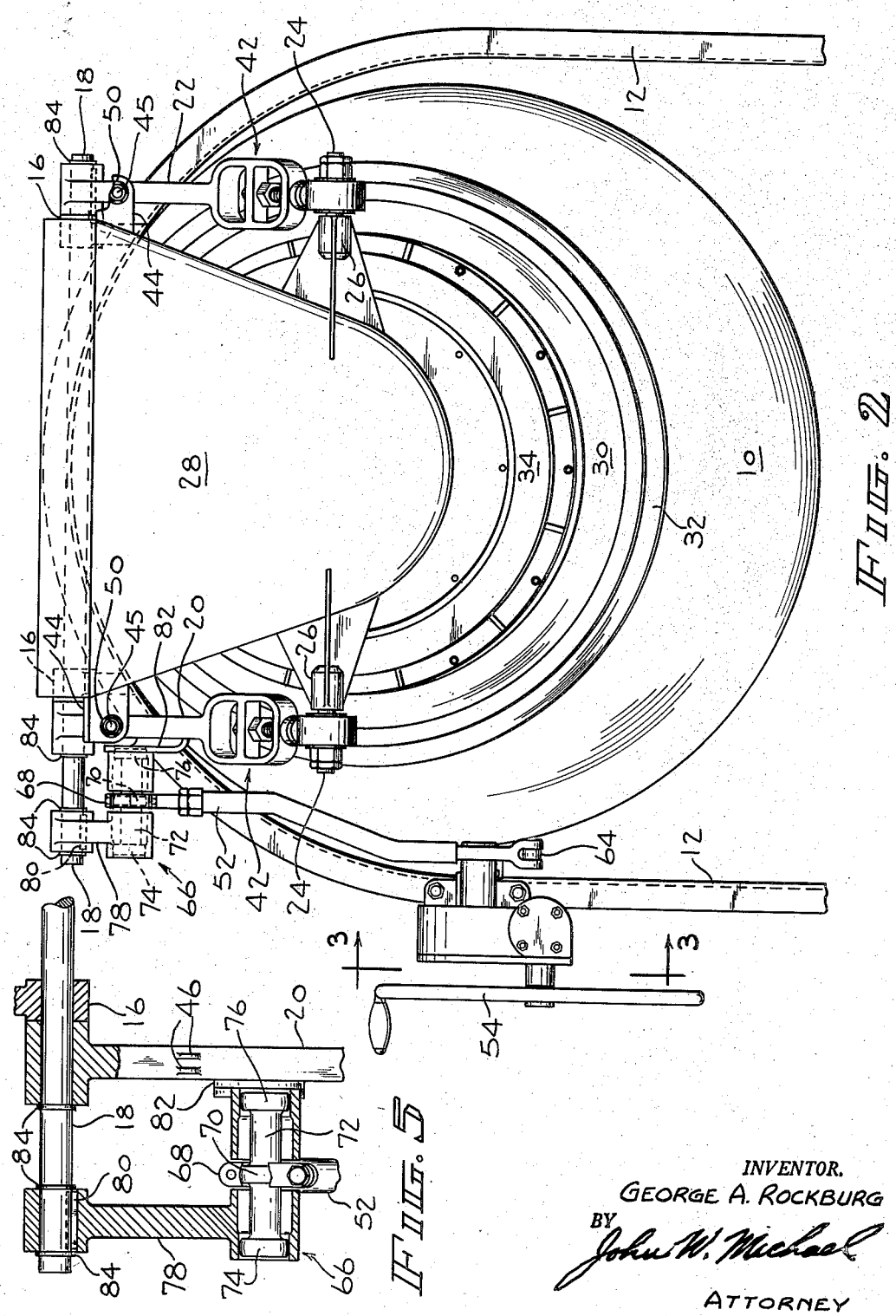

2,563,963

UNITED STATES PATENT OFFICE 2,563,963

TRUCK MIXER

George A. Rockburg, Milwaukee, Wis., assignor to The T. L. Smith Company, Milwaukee, Wis., a corporation of Wisconsin Application November 6, 1948, Serial No. 58,782

15 Claims. (Cl. 259—161)

This invention relates to truck type concrete mixers and particularly to self-adjusting means for maintaining the charging hopper assembly properly seated against the mouth of the mixing drum.

Truck mixers generally have a drum lined with spiral blading and rotatably mounted on the truck frame. A charging hopper is pivoted on the frame for movement to and from the charging position and comprises a funnel-like chute surrounded at its discharge end by an annular closure plate adapted to seat against the mouth of the mixing drum when the assembly is in the charging position and throughout the mixing operation. When the hopper is in charging position, the plate which surrounds the discharge end of the hopper seats against and rotates with the rotating drum while the chute remains stationary. During charging and mixing the drum may rotate in the direction in which the blading moves the mix forward, thus increasing the charging rate, and drum rotation may be reversed for discharging the mix through the mouth, although in some instances the drum is always rotated in the same direction for charging and discharging.

The problem of maintaining the desired closure has not heretofore been solved to complete satisfaction. It is simple enough to obtain a satisfactory seat at the factory, but the drum becomes cocked with respect to the hopper assembly due to weaving or distortion of the frame, and it is under such conditions that the former closures failed. The Ball patent, No. 2,265,752, shows what appears at first blush to be a good solution wherein the hopper is slidably carried on a shaft co-axial with the drum, but in service the shaft bends under the load of the hopper and the initial seal is lost.

Another mounting previously used pivoted the hopper assembly on a generally horizontal overhead shaft fixed on the frame as shown in the Peters, et al. patent, No. 2,267,801, but drum twisting also rendered this closure ineffective. Barnes patent, No. 2,374,912, carried the hopper assembly on arms pivoted on a fixed shaft and rotatably connected to the hopper through a rubber-cushioned pivot permitting the seat to adjust for drum misalignment about a horizontal axis and for slight misalignment about the vertical axis. While this structure was a great advance, the shifting about the vertical axis was not entirely compensated and in this respect the closure was not completely satisfactory. The Barnes structure did not seat the hopper assembly against the drum with equal force over the entire annular seating surface, and some mix could spill out upon cocking of the drum.

The present invention is an improvement over the Barnes structure and provides a mounting for the charging hopper which insures proper closure between the hopper assembly and the drum even after the drum has shifted about a horizontal or vertical axis.

The principal object of this invention, therefore, is to provide a mounting for a truck mixer charging hopper assembly which will maintain proper closure with the drum regardless of shifting therebetween.

Another object of this invention is to provide a hopper assembly mounting for truck mixers which seats the assembly against the drum with equal force over the seating surface.

A further object is to provide a hopper assembly mounting for truck mixers which causes the assembly to seat properly and to follow the drum shifting and twisting movements during transit.

Other objects and advantages will be pointed out in, or be apparent from, the specification and claims, as will obvious modifications of the single embodiment shown in the drawings, in which:

Fig. 1 is a fragmentary side elevation with parts broken away of a truck mixer having the hopper seated against the mouth of the drum;

Fig. 2 is an end view of the truck mixer shown in Fig. 1;

Fig. 3 is a fragmentary view taken along line 3—3 of Fig. 2 with parts in section and shows one form of a hand operated lever actuating mechanism;

Fig. 4 is a sectional view taken along line 4—4 of Fig. 3; and

Fig. 5 is a fragmentary sectional view taken on line 5—5 in Fig. 1.

Referring in detail to the drawings which illustrate the rear end portion of a high discharge type truck mixer having mixing drum 10 rotatably mounted on the frame on an inclined axis to elevate the open end or mouth of the drum. U-shaped channel 12 forming part of the frame straddles the rear end of the drum and serves as a support for hopper assembly 14. A pair of bearing supports 16 are welded to channel 12 and extend slightly to the rear of the channel to support shaft 18. A pair of depending hangers or arms 20, 22 are rotatably connected to laterally projecting studs 24, 24 substantially on the diameter of assembly 14. As in the Barnes patent the studs may be threaded into bosses 26 rigidly supported by means of sheet metal pieces faired into hopper 28 and the hopper supporting ends of arms 20, 22 may be connected to the studs 24, 24 through rubber sleeves rotatable thereon to render the point of connection somewhat resilient.

Hangers 20, 22 may be raised and lowered by means to be described hereinafter to bring hopper assembly 14 into the discharging or charging position. When the assembly has been lowered to the charging position, closure plate 30 frictionally engages and rotates with drip ring 32 carried by the drum end to provide a true seating surface. Closure plate 30 is rotatably carried by hopper 28 by means of a bearing generally denoted by numeral 34 which is sealed from the drum interior by means of annular metal seal 36 resiliently carried by an elastic annular ring 38 of neoprene, rubber or other suitable material, biasing ring 36 into contact with the inner surface of bearing plate 40. The details of this bearing and seal arrangement form no part of this invention but are described and claimed in my co-pending application Serial No. 64,745.

It will be apparent, therefore, that the rotatable connection of arms 20, 22 to the diametrically opposed studs 24, 24 permits the assembly 14 to adjust itself about a horizontal axis in seating closure plate 30 on drip ring 32 when the assembly is lowered to the charging and mixing position. Each hanger 20, 22 is provided with a turnbuckle arrangement 42 to permit adjustment of the hopper relative to the end of the drum to obtain proper co-axial relationship therewith. In order to prevent free swinging of the hopper assembly about the generally horizontal axis of studs 24, means are provided for yieldably maintaining the assembly in a predetermined position with respect to the arms. For this purpose a T-bar 44 is welded to the top on each side of hopper 28 and is provided with a hole in the depending leg thereof. Threaded rod 45, pivoted between upstanding ears 46 on each of the arms 20, 22, passes through the hole in the T-bar and has springs 47, 47 compressed between adjustable nuts 48, 48 and rounded seats 50 slidable along the rod and bearing against opposite sides of the depending T-bar leg. The action of the springs bearing against the T-bar tends to maintain a predetermined relationship between hopper assembly 14 and depending arms 20, 22 but will permit of relative movement between the arms and the assembly as the assembly rotates about the generally horizontal axis of studs 24 when seating on the drum mouth.

Right-hand (Fig. 2) hopper arm 22 is keyed to shaft 18 for rotation therewith, while left-hand arm 20 is rotatably mounted on the shaft. Raising or lowering adjustable link 52 by means of hand wheel 54 turning bevel gear 56, which meshes with a second bevel gear 58 turning worm 60 and worm gear 62 which has crank 64 keyed to its shaft 65 and actuating link 52 raises and lowers the hopper assembly 14 between its charging and discharging positions by acting on the hangers through what I prefer to call an equalizer bar assembly generally denoted by numeral 66, shown in greater detail in Fig. 5.

Link 52 is provided with a split bearing 68 having a spherical inner surface adapted to cooperate with central spherical bearing surface 70 on equalizer bar 72. The right- and left-hand ends of bar 72 are provided with similar spherical bearing surfaces 74, 76. Left-hand bearing 74 cooperates with the cylindrical bearing surface provided in the end of lever 78 keyed to shaft 18 at 80 while the right-hand spherical bearing cooperates with a cylindrical bearing provided in a laterally projecting sleeve arrangement carried by an upstanding ear 82 on the left-hand hopper arm 20. The sleeve-like projections extending inwardly toward split bearing 68 from the cylindrical bearings in arms 78 and 20 maintain proper spacing. It should be noted that arms 20, 22 and 78 are all retained in proper axial position on shaft 18 by spring rings 84. Since arm 78 and the right-hand hanger 22 are both keyed to the shaft and thus maintain a predetermined relationship, actuation of lever 78 by equalizer bar mechanism 66 will also actuate hanger 22. Thus the link 52 simultaneously actuates both hangers or arms 20, 22.

It should be noticed that the provision of the equally spaced spherical bearings 70, 74, 76 on bar 72 insures equal force application on the arms at all times and permits the bar to tilt to differentially actuate the arms in their rotary movement about the axis of the supporting shaft 18. It will now be apparent that the provision of tiltable equalizer bar 72 permits the hopper assembly 14 to automatically adjust itself about a generally vertical axis to compensate for vertical twisting of the drum with respect to the frame and, therefore, allows closure plate 30 to properly seat on drip ring 32. For example, assuming that the assembly is being lowered into the charging position and the left-hand portion strikes the drip ring first, the equalizer bar merely cocks to further move lever 78 and thus continue the closing movement of hanger 22 until the right-hand side of the assembly makes a firm contact. Conversely, if the right-hand side of the assembly contacted the drip ring first the equalizer bar would permit of further movement of the left-hand side by tilting and continuing movement of arm 20. It will be noted that when the hand wheel has been turned to the full extent the force application on each side of the hopper assembly is equal.

Thus the hopper assembly readily adjusts itself about the generally horizontal axis provided by the pivotal connection of arms 20, 22 to studs 24, 24, and about a generally vertical axis by virtue of the tilting equalizer bar arrangement permitting of a differential movement between arms 20, 22 while simultaneously actuating the arms. Indeed, this structure virtually provides universal movement in seating the hopper assembly on the drum, thus making the structure self-aligning. A further advantage lies in the fact that the length of shaft 18 plus the mechanical advantage of the usual hand actuating mechanism permits of considerable twisting of shaft 18, thus providing an appreciable tortional resiliency biasing the closure plate into contact with the drip ring. This tortional resiliency is so great as to cause the hopper and closure plate to follow the drum in its shifting movements as the truck is driven over rough terrain.

Thus it will be seen that I have provided a hopper assembly which readily adjusts itself to proper seating contact with the drip ring of the rotating mixing drum under all conditions. It will be clear that other link actuating mechanisms may be used and that other structures may be modified. It will be readily apparent that obvious modifications of the equalizer bar assembly may be made without departing from the concept of differentially moving the hopper supporting arms. It is intended, therefore, that this

I claim:

1. The combination with the hangers of a drum closure hopper assembly swingable into and out of contact with the mouth of a truck mixer drum, said drum being rotatable about a fixed axis, of means for swinging the hangers to seat the assembly against the mouth of the drum, means for imparting differential movement to the hangers to compensate for misalignment between the assembly and the drum and means for substantially equalizing the force applied to the hangers.

2. In a truck type mixer, the combination with a mixing drum rotatably mounted on a fixed frame with its mouth rearwardly disposed, of a charging hopper having a closure plate rotatably mounted thereon and adapted to engage and rotate with the drum mouth, a pair of hangers connected to said hopper and being pivotally mounted on said frame to support the hopper and permit it to be swung into the drum charging position with the closure plate in contact with the drum mouth, and means for swinging the hangers and including means for imparting differential movement to the hangers to insure firm closure between the plate and the mouth under all operating conditions.

3. In a truck type mixer, the combination with a mixing drum rotatably mounted on a fixed frame with its mouth rearwardly disposed, of a charging hopper having a closure plate rotatably mounted thereon and adapted to engage and rotate with the drum mouth, a pair of arms connected to said hopper and being pivotally mounted on said frame to support the hopper and permit it to be swung into the drum charging position with the closure plate in contact with the drum mouth, means for applying force to the arms to swing the hopper, and means for equalizing the force applied to each arm when the plate is seated against the drum mouth.

4. In a truck type mixer, the combination with a mixing drum rotatably mounted on a fixed frame with its mouth rearwardly disposed, of a charging hopper including a closure plate rotatably mounted thereon and adapted to engage and rotate with the drum mouth, a pair of arms connected to said hopper and being pivotally mounted on said frame to support the hopper and permit it to be swung into the drum charging position with the closure plate in contact with the drum mouth, and means for differentially swinging the arms and equalizing the force applied by the arms when retaining the hopper in the charging position with the plate against the drum mouth.

5. In a truck type mixer, the combination with a mixing drum rotatably mounted on a fixed frame with its mouth rearwardly disposed, of a charging hopper having a rotatable closure member associated therewith and adapted to engage and rotate with the drum mouth when the hopper is in the drum charging position, a pair of arms connected to the hopper and being pivotally mounted on support means carried by the frame to permit the hopper to be swung about the pivotal axis of the support means between the charging position and the discharging position, means for swinging the arms about said support means, and means for equalizing the force applied by the arms on the hopper.

6. In a truck type mixer, the combination with a mixing drum rotatably mounted on a fixed frame with its mouth rearwardly disposed, of a charging hopper having a rotatable closure member associated therewith and adapted to engage and rotate with the drum mouth when the hopper is in the drum charging position, a pair of hangers connected to the hopper and being pivotally mounted on support means carried by the frame to permit the hopper to be swung about the pivotal axis of the support means between the drum charging position and the drum discharging position, and means for simultaneously swinging the hangers and for equalizing the seating force exerted by the hangers when the hopper is in the charging position.

7. In a truck type mixer, the combination with a mixing drum rotatably mounted on a fixed frame with its mouth rearwardly disposed, of a charging hopper having a rotatable closure member associated therewith and adapted to engage and rotate with the drum mouth when the hopper is in the drum charging position, a pair of arms connected to the hopper and being pivotally mounted on support means carried by the frame to permit the hopper to be swung about the pivotal axis of the support means between the charging position and the discharging position, and movable means operable to exert a force and adapted to swing the arms about the pivotal axis of the support means, and means connected to said movable means and to said arms to equalize the force on the arms.

8. In a truck type mixer, the combination with a mixing drum rotatably mounted on a frame with its mouth rearwardly disposed, of a charging hopper having a rotatable closure plate associated therewith and adapted to engage and rotate with the drum mouth when the hopper is in the drum charging position, a pair of arms connected to the hopper and being pivotally mounted on support means carried by the frame to permit the hopper to be swung about the pivotal axis of the support means between the charging position and the discharging position, said arms being connected to the ends of an equalizer bar, and actuating means connected to the equalizer bar to act through the bar to swing the arms about said pivotal axis, said equalizer bar being tiltable with respect to the arms and said actuating means to permit of differential movement of the arms and to equalize the force on the arms when the closure plate is seated on the drum mouth.

9. In a truck type mixer, the combination with a mixing drum rotatably mounted on a fixed frame with its mouth rearwardly disposed, of a charging hopper having a closure plate rotatably associated therewith and adapted to engage and rotate with the drum mouth when the hopper is in the drum charging position, a pair of depending arms pivotally mounted for swinging movement on support means carried by the frame and pivotally connected to the hopper, the axis of the pivotal connection to the hopper being generally horizontal to permit the closure plate to adapt itself to the drum mouth about a horizontal axis when the hopper is swung into charging position, the axis of the pivotal mounting of the arms on the support means being generally horizontal, and means for swinging the arms about the pivotal mounting, said swinging means including means for differentially swinging the arms about the pivotal mounting to automatically adjust the closure plate about an axis generally vertical with respect to the drum mouth.

10. In a truck type mixer, the combination with a mixing drum rotatably mounted on a frame with its mouth rearwardly disposed, of a charging hopper having a closure plate rotatably associated therewith and adapted to engage and rotate with the drum mouth when the hopper is in the drum charging position, a pair of depending arms pivotally mounted for swinging movement on support means carried by the frame and pivotally connected to the hopper, the axis of the pivotal connection to the hopper being generally horizontal to permit the closure plate to adapt itself to the drum mouth about the horizontal axis when the hopper is swung into charging position, the axis of the pivotal mounting of the arms on the support means being generally horizontal, means connecting each arm to an end of an equalizer bar, and actuating means connected to the equalizer bar between its ends and acting through the bar to swing the arms about the pivotal mounting, said bar being tiltable with respect to the arms and the actuating means to permit of differential movement of the arms to automatically adjust the closure plate about a generally vertical axis with respect to the drum mouth.

11. In a truck type mixer, the combination with a mixing drum rotatably mounted on a frame with its mouth rearwardly disposed, of a charging hopper having a closure plate rotatably associated therewith and adapted to engage and rotate with the drum mouth when the hopper is in the drum charging position, a shaft rotatably mounted on the frame, a first arm keyed to the shaft for rotation therewith and connected to the hopper, a second arm rotatably mounted on the shaft and connected to the hopper, a third arm keyed to the shaft for rotation therewith, said second and third arms being connected to the ends of an equalizer bar, and actuating means connected to the bar between the ends for moving the bar and swinging the arms to move the hopper to or from the charging position, said equalizer bar being tiltably connected to the second and third arms and said actuating means to permit differential movement of the arms.

12. In a truck type mixer, the combination with a mixing drum rotatably mounted on a frame with its mouth rearwardly disposed, of a charging hopper having a closure plate rotatably associated therewith and adapted to engage and rotate with the drum mouth when the hopper is in the drum charging position, a generally horizontal shaft rotatably mounted on the frame, a first arm keyed to the shaft for rotation therewith and pivotally connected to the hopper, a second arm rotatably mounted on the shaft and pivotally connected to the hopper, said pivotal connections having a generally horizontal axis to permit the hopper to adjust thereabout when in the charging position, a third arm keyed to the shaft for rotation therewith, said second and third arms being connected to the ends of an equalizer bar, and actuating means connected to the bar between the ends for moving the bar and swinging the arms to move the hopper to or from the charging position, said equalizer bar being tiltably connected to the second and third arms and said actuating means to permit differential movement of the arms to adjust the hopper about a generally vertical axis.

13. In a truck type mixer, the combination with a mixing drum rotatably mounted on a fixed frame with its mouth rearwardly disposed, of a charging hopper assembly adapted to engage the drum mouth, a pair of arms connected to said assembly and being pivotally mounted on said frame to permit the assembly to be swung into and out of engagement with the drum mouth, means for applying force to the arms to swing the assembly, and means for equalizing the force applied to each arm when the assembly is in engagement with the drum mouth.

14. In a truck type mixer, the combination with a mixing drum rotatably mounted on a fixed frame with its mouth rearwardly disposed, of a charging hopper assembly adapted to engage the drum mouth, a pair of arms connected to said assembly and being pivotally mounted on said frame to permit the assembly to be swung into and out of engagement with the drum mouth, and means for differentially swinging the arms and for equalizing the force applied to the arms when retaining the assembly in engagement with the drum mouth.

15. In a truck type mixer, the combination with a mixing drum rotatably mounted on a fixed frame with its mouth rearwardly disposed, of a charging hopper assembly adapted to engage the drum mouth, a pair of arms connected to said assembly and being pivotally mounted on said frame to permit the assembly to be swung into and out of engagement with the drum mouth, and means for simultaneously swinging the arms and for equalizing the force exerted on the arms when the assembly is in engagement with the drum mouth.

GEORGE A. ROCKBURG.

REFERENCES CITED

The following references are of record in the file of this patent:

UNITED STATES PATENTS

| Number | Name | Date |
|---|---|---|
| 1,848,223 | Reed | Mar. 8, 1932 |
| 2,265,751 | Ball | Dec. 9, 1941 |
| 2,265,752 | Ball | Dec. 9, 1941 |
| 2,360,345 | Hilkemeier | Oct. 17, 1944 |
| 2,454,940 | Peters | Nov. 30, 1948 |